Patented May 4, 1948

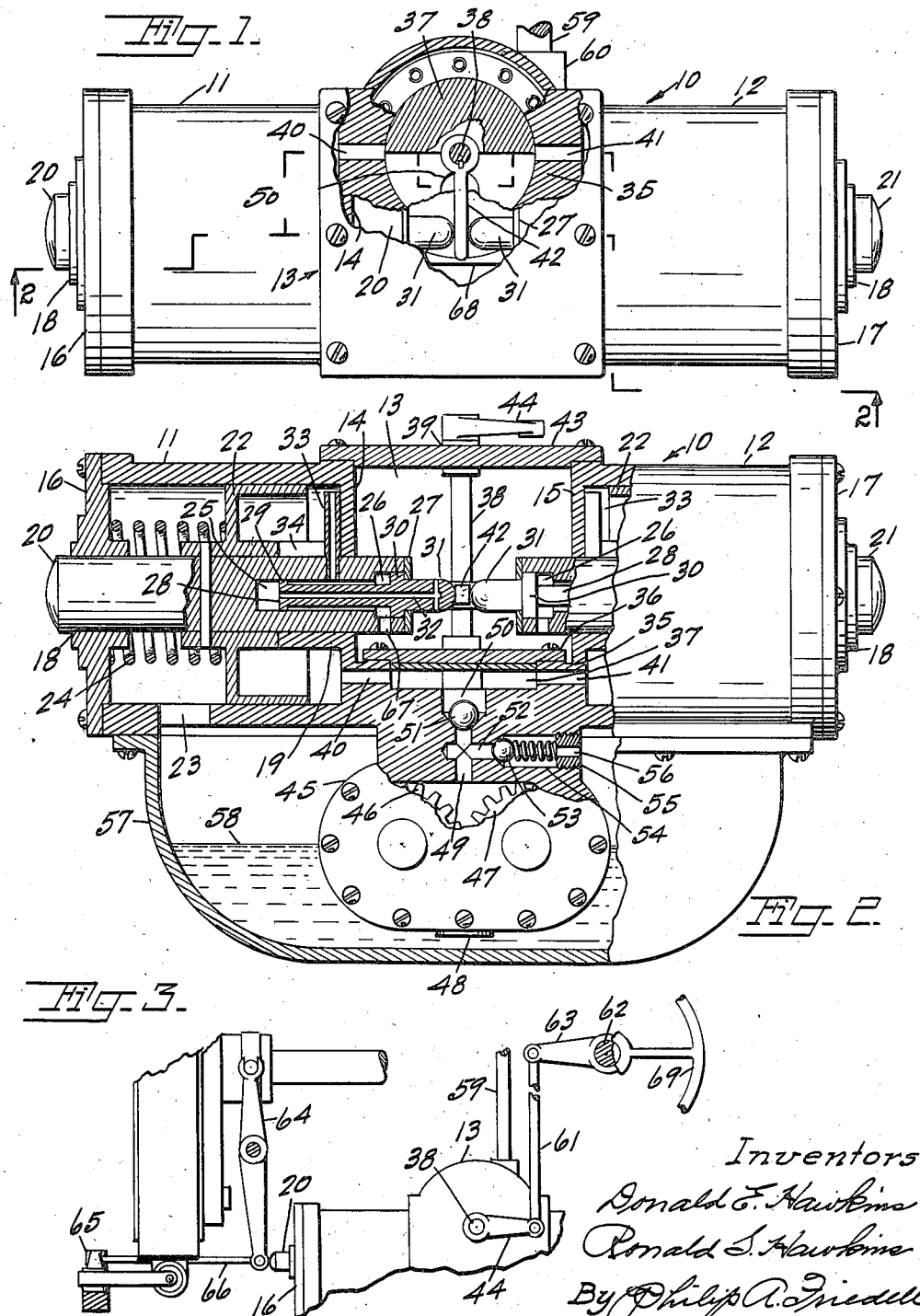

2,440,948

UNITED STATES PATENT OFFICE 2,440,948

SINGLE CONTROL PILOT

Donald E. Hawkins, Berkeley, and Ronald S. Hawkins, Albany, Calif.

Application April 16, 1945, Serial No. 588,686

12 Claims. (Cl. 60—97)

This invention, a single-control pilot, is primarily designed for piloting or steering tread-type vehicles, such as endless tread tractors and other types of vehicles in which steering is conducted through selective actuation and de-actuation of the driving means for the respective sides of the vehicle, such as through selective de-clutching and the application of brakes on the conventional tractor. It is further designed to make steering practically effortless with the vehicle responding instantaneously to the slightest movement of the manual control means and in substantially exact proportion to such movement.

The invention is also adaptable to other purposes, such as hydraulic forcing and will provide an excellent hydraulic press delicately responsive to substantially effortless manual adjustment of a control lever or knob and in exact relation to said adjustment, using one or both cylinders; as a feed water valve regulator for steam plants, using one cylinder only; for any device which requires regulated one-way or two-way control.

Conventional tractors require no change in their design for installation of this device, and the fluid pump used for developing the power can be operated from the transmission power take-off or other driven portion of the vehicle.

This device incorporates hydraulically actuated and controlled rams and controls therefor which are extremely sensitive and almost effortlessly operable, and which will selectively cause the rams to advance or retract at will in conformity with the degree of advance or release of the control means, and by which the power on the rams can be increased or decreased at will. Though the ram can be made to exert any pressure ranging from a few pounds to tons, the effort required for control of that pressure and for any advance or retraction of the ram remains the same, not more than a few ounces.

The objects and advantages of the invention are as follows:

First, to provide a device incorporating a hydraulically-actuated ram which may be caused to advance or retract, and increase or decrease the applied power, at will, under control of a single substantially effortlessly actuated control.

Second, to provide a pilot for selectively controlling the clutches and brakes on endless tread and like vehicles for steering the vehicle.

Third, to provide a device as outlined in which control means is provided to which the ram or rams is or are instantly responsive.

Fourth, to provide a device as outlined in which the movements of the rams and the force applied thereto are directly and instantly responsive to the control means, with no change in urgence or resistance developed in the control means irrespective of the degree of movement or of the force applied to the rams.

Fifth, to provide a hydraulic device including a pair of rams and manual single control means therefor, and a source of fluid under pressure, and in which the rams are selectively responsive to, and to the same degree, and in the same direction, as movements or adjustments of the control means.

Sixth, to provide a device as outlined which can be applied to existing vehicles or new vehicles without any change in design of the vehicles.

In describing the invention reference will be made to the accompanying drawings, in which:

Fig. 1 is a top plan view of the invention with portions broken away and partly shown in section to illustrate the control means.

Fig. 2 is a rear elevation of the invention shown partly in sections on several vertical planes as indicated by line 2—2 in Fig. 1, to illustrate the interior construction and the relation between the control elements and other operating parts.

Fig. 3 is a diagrammatic view illustrating how the invention is applied to one type of endless tread type of vehicle for control of the clutch and brake system for steering.

The invention includes a casing 10 having cylinders 11 and 12 in axial alignment and separated by a control housing 13 formed between the inner ends 14 and 15 of the respective cylinders. Heads 16 and 17 are provided for the outer ends of the respective cylinders and each is formed with an axial bearing 18, and suitably secured to the end of its cylinder. A bearing 19 is also formed axially in the bottom end of each cylinder, and the rams 20 and 21 are slidable in these bearings in the respective cylinder heads and bottoms.

Immovably secured on each ram or formed integrally therewith is a piston 22 which slidably operates in its cylinder, and a passage 23 is formed in the lower side of each cylinder between the piston and the cylinder head to drain any oil away from the space therebetween. A compression spring 24 operating between the piston and cylinder head urges the piston toward the bottom of the cylinder.

The control means includes an axial bore 25 formed in the inner end of each ram, and counterbored as indicated at 26, and a cap 27 is provided for the end of the ram. The plunger 28 operates in the bore 25 and has a head 29 slidably fitting the bore, and an annular collar 30 slidably fits in the counterbore 26 with the control end of the plunger or button 31 slidably operating through a bore in the cap 27. A breather passage 32 is formed axially through the plunger and has an outlet through the projecting portion of the plunger as indicated. The plunger is reduced in diameter between the head 29 and collar 30, and a combined discharge tube and key 33 is fixed in the ram and communicates with the space between the head 29 and collar 30 of the bore 25 and extends upwardly nearly to the top wall of the cylinder and slidably operates in a slot 34 formed in the upper side of the hub 19. This slot can be formed in the casting since its actual function is to maintain the discharge tube in a vertical position by preventing the ram from rotating while permitting axial movement, the tube functioning to first permit the escape of any entrapped air to ensure full hydraulic operation of the piston.

Formed in the bottom wall of the chamber 13 between the inner ends of the cylinders is a three-way valve casing 35 which is provided with a cover 36. A valve plate 37 comprising a half disc is rotatably mounted in the casing and fixed on the control shaft 38 which is rotatable in a bearing 39 in the cover. Passages 40 and 41 communicate through the ends of the respective cylinders and with the interior of the casing 35 and these passages can be formed by drilling diametrically through the valve casing from one cylinder bottom.

Mounted on the shaft 38 is a finger 42 against the opposite side of which the button ends 31 of the control plungers rest, and the shaft 38 has bearing through the cover plate 43 of the unit as indicated and has a control lever 44 mounted at its upper end.

Projecting below the cylinder block is a pump housing 45 with two intermeshing gears 46 and 47 operating therein and with the pump having an intake 48 at the lower end and a discharge 49 at the upper end communicating with the interior of the valve casing at 50 and provided with a check valve 51. A bypass 52 is in communication with the discharge passage 49 and has a pressure relief valve which may be of any suitable type, such as a ball 53 urged by a spring 54 which in turn is retained by a plug 55 provided with a passage 56.

An oil sump or receptacle 57 is sealed and secured to the bottom surface of the cylinder block and carries a supply of oil or other liquid 58 for operation of the pilot, and a shaft 59 has one end extending through a suitably packed bearing 60 formed on the front side of the oil sump for connection to a source of power, such as a power take-off on the transmission or other part of the vehicle, and has its other end fixed in one of the pump gears 47, and functioning as the driving means for the pump.

The operation of the invention in connection with an endless-tread vehicle or the like, is as follows:

The rams 20 and 21 are made of such length that their overall span when retracted will be equal to or slightly less than the distance between the clutch levers of the vehicle in released position, and the unit is mounted in a position where the rams will cooperate with these levers.

The shaft 59 is connected to the power take-off on the vehicle transmission. The lever 44 is connected through a suitable connection 61 with the manual control lever, knob, or as illustrated, the steering column 62 through a lever 63. If the brake control mechanism has no direct connection with the clutch control levers 64 for sequential operation to follow release of the clutch by application of the brake, suitable mechanism is incorporated such as a bell-crank lever 65 and a connecting rod 66, with initial play so as not to operate the brake during initial operation of the clutch lever; the exact arrangement depending upon the specific clutch and brake arrangement of the vehicle.

The sump or receptacle 57 is provided with a suitable supply of oil or other suitable liquid. With the vehicle motor in operation, the pump is driven continuously, taking oil through the intake 48 and delivering it through the discharge 49 past the check valve 51 into the valve housing through the port 50 and thence through the passages 40 and 41 into the cylinders 11 and 12, the springs 24 retaining the pistons in their retracted positions shown, the oil filling the space between the inner end of each cylinder and its piston, the air first being driven down through the tubes 33 followed by the oil as pumped, into the space between the head 29 and collar 30, into the counterbore 26 and thence out through the passage 67 in each plunger, thence over the edge 68 of the bottom wall of the control housing 13. Thus there is no movement of the plungers or rams. The brakes on both sides of the vehicle are free and the clutches are engaged, driving the vehicle straight forward.

A slight turn counterclockwise of the steering column 62 will move the finger 42 to the left and move the valve plate 37 clockwise, opening the passage 40 and closing the passage 41, so that all oil pumped will be delivered to the cylinder 11. This movement of the finger 42 simultaneously adjusts the plunger 28 inwardly with the collar 30 closing the passage 67 so that no oil can escape through the tube 33 and thence out of passage 67, the piston with its ram 20 being forced to the left against the urgence of the spring 24 until the port 67 is uncovered by that movement to permit the oil as pumped to again escape under a pressure in conformity with the pressure against which the ram is operating, the oil merely continuing to circulate into the piston and back to the sump as long as there is no further adjustment of the steering column.

The difference in area between the head 29 and collar 30 is just sufficient to hold the button 31 against the finger 42, and this differential may be as little as an ounce or two. The ram follows the plunger, and the plunger will move only through urgence or release of the finger and will follow every movement of the finger.

With this slight movement of the steering column there will be only a slight movement of the ram, substantially equal to that of the control plunger, the clutch will be only slightly eased and the brake will not be applied on the left tread, therefore the vehicle will swing very slowly through a very long radius. There will be no movement of either the plunger or the ram at the other end of the unit so that the right tread will operate normally.

Now if the steering column is turned a little further, the finger 42 will be moved farther, depressing the plunger again with the collar again covering the passage 67 and the piston and ram will again move forward a corresponding amount until the passage is again cleared sufficiently to permit the surplus oil to escape back to the sump. The clutch will be fully released and the vehicle will turn on a shorter radius than before.

Further turning of the steering column will depress the plunger again, bringing the brake control mechanism into operation to set the brake. With the clutch free and the brake set, and with the other track driving under full power, the vehicle will turn on its very shortest possible radius. Obviously, the steering column can be turned to its limit of movement, under which conditions, the ram will move all the way to release the clutch and then apply the brake for a sudden sharp turn.

By turning the steering column as far as it will go, if the ram is limited as to movement by an external obstruction, such as when used as a hydraulic press so that it cannot uncover the passage 67, maximum pressure will be developed against the piston and delivered through the ram, and that maximum pressure is dependent upon the resistance of the relief valve 53, the surplus oil then passing out through the passage 56 to the sump under a pressure or head equal to that developed in the cylinder. To ease that pressure it is only necessary to slightly ease the finger 42. There will be no retraction of the ram until the plunger is eased enough to uncover the passage 67 sufficiently to pass all of the surplus oil pumped.

By turning the steering column to its mean or neutral position the button end of the plunger will maintain contact with and follow the finger, fully opening the passage 67, with the spring 24 returning the ram to its retracted position.

To turn the vehicle in the opposite direction, the steering column is merely turned in the opposite direction when the same effects are produced through the right hand end of the unit, and with the left hand of the unit idle.

Thus, by a single manual control, which can be merely a knob or small hand lever because of the very small effort required to control the ram control valve incorporating the plunger 28 with its head, collar and button, and the bore 25 and passage 67, or a steering column with steering wheel 69 as illustrated, any vehicle in which the respective sides are selectively controlled for steering as by clutches and/or brakes, and particularly endless tread vehicles, can be steered and controlled as readily and even more easily than a conventional automotive vehicle.

As will readily be seen, the device will readily adapt itself to many other uses, such as for hydraulic forcing, pressing bearings in or out, operating levers and other control devices, by providing suitable mounting means, and using one or more cylinders and rams in accordance with requirements.

We claim:

1. A hydraulic control and power unit, in combination; oppositely projectable hydraulically actuable rams, each having a piston intermediately fixed thereon, and a pair of axially aligned cylinders for the pistons and each having a head at each end with the ram operating therethrough, and a supply of fluid under pressure; valve means for selectively controlling delivery of fluid to the respective cylinders; an axially movable control valve associated with each ram for controlling discharge of fluid from its associated cylinder; said control valves being operable in opposite directions selectively and closely related and axially aligned; a single manual control adjustable in two directions for simultaneously controlling said valve means, and said control valves selectively and including a lever interposed between said control valves for the selective control to deliver fluid under pressure to one cylinder and stop delivery to the other cylinder and simultaneously stop discharge from said one cylinder with axial adjustment of one of said control valves in one direction through selective adjustment of said lever; axial movement of the ram under fluid pressure providing secondary control of said discharge and including differential pressure means for said control valves for maintaining their adjusted position irrespective of movement of the ram and limiting axial movement of the ram substantially to that of the control valve applied through said lever.

2. A structure as defined in claim 1; said supply of fluid under pressure including a receptacle integral with said unit and having the fluid therein, and a pump mounted within said receptacle and driving means for said pump for delivering said fluid under pressure to said valve means; said valve means normally passing said fluid under pressure simultaneously to both cylinders; said single manual control comprising a shaft associated with said valve means for adjustment thereof for selective passage of fluid to said cylinders; said lever being mounted on said shaft for selectively axially adjusting said control valves simultaneously with adjustment of said valve means; and a manually operative member on said shaft.

3. Hydraulic control and power unit comprising; two cylinders in opposition and in axial alignment and spaced to form a control compartment therebetween, and a head for each end of each cylinder; a ram having a piston intermediately located thereon and slidably operating in each cylinder and each ram having its respective ends slidably operating through the respective heads of its associated cylinder with one end extending into said control compartment; means for urging each ram to a retracted position; a supply of liquid under pressure; a delivery control valve for selectively controlling the flow of liquid to the respective cylinders; an axially adjustable control valve associated with each ram and a discharge passage controlled thereby and formed in the ram; single manual control means for simultaneous control of said delivery valve, and said control valves selectively; said control valves controlling discharge from said cylinders to initiate movement of the rams with movement of the ram providing secondary control of discharge to limit its movement substantially to that of the control valve, and differential pressure means included in said control valves for maintaining the adjusted positions of the control valves irrespective of movements of the rams.

4. A structure as defined in claim 3; said supply of liquid under pressure including a container mounted on the underside of said cylinders; a pump within said container and driving means therefor for pumping said liquid to said delivery valve; said delivery valve having passages to the respective cylinders and simultaneous control means for said passages; said single manual control means comprising a shaft for operation of said delivery valve and having a finger mounted thereon and interposed between said control valves for selective operation thereof simultaneously with operation of said delivery valve.

5. A structure as defined in claim 3; said control valves, each including an axial bore formed in the inner end of the ram and terminating in a counterbore, and a discharge passage diametrically entering said counterbore; a plunger having a head slidable in said bore and a collar slidable in said counterbore and movable to two positions respectively with the collar clearing and closing the discharge passage; said plunger being reduced in diameter between said head and said collar to form a passage for fluid to said discharge passage and with the difference in areas of the collar and head being of relatively small variance for minimum urgence requirements for adjustment and comprising said differential pressure means; a passage formed through said ram diametrically and including a tubular member extending upwardly to the topmost portion of inside of the cylinder and communicating with said discharge passage, whereby the cylinder is maintained filled with liquid and free of gases.

6. A structure as defined in claim 3; said compartment having a bottom wall with said delivery valve located therein and comprising a cylindrical housing having a diametric passage therethrough communicating between the housing and the respective cylinders and having a continuously open intake passage; and a segmental adjustable member rotatable in said housing and normally retained in neutral position in which the adjustable member at least partly uncovers the passages to both cylinders and is rotatable to positions to selectively close and open the passages to the respective cylinders and a shaft for said segmental member and manual control means on said shaft and comprising said single manual control means.

7. A control valve for controlling movement of a fluid actuated plunger operating in a cylinder, comprising; a first axial bore formed in one end of the plunger and terminating in a slightly larger counterbore for minimum pressure differential, and a diametric discharge passage entering said counterbore, and a cover for the end of said counterbore and having a second axial bore; an axially movable valve plug having a head slidably fitting in said first axial bore and a collar slidably fitting in said counterbore and movable to two positions to close and open said discharge passage; said valve plug being reduced in diameter between said head and said collar to provide a passage for fluid to said discharge passage, and a passage communicating between said passage for fluid and the inside of the cylinder and formed through the wall of the plunger; said valve plug having a control button projecting from the end of said plunger through said second axial bore for manual depression and retention thereof, the differential areas of said collar and said head comprising means for maintaining said plug against movement with the plunger, and with the plunger being responsive to each movement of the control button, and the slight differential areas of said collar and head providing minimum required urgence under the pressure of the fluid for actuating the plunger while maintaining maximum sensitivity of the button to slight manual pressures.

8. Hydraulically actuated forcing means comprising; a cylinder; a head for each end of the cylinder and a piston slidable in the cylinder, and a ram slidably operating through both heads and intermediately axially fixed in said piston; a liquid container dependent from said cylinder and a supply of liquid therein and a pump in said container and driving means therefor for delivering liquid from said supply continuously to said cylinder; a control valve including an axial bore terminating in a counterbore of slightly larger diameter and formed in said ram, and a plunger having a terminal end slidable in said axial bore and having a collar adjacent its other end slidable in said counterbore, and a cover for said counterbore and having an axial passage, and a button extending axially from said collar through said axial passage and coaxially adjustable for initial control of discharge of fluid from said cylinder through said discharge passage, with said ram functioning as secondary control means for discharge of fluid through a discharge passage formed through the wall of said counterbore following movement of the ram a distance substantially equal to the axial adjustment of the button; and manual control means for adjusting said button at will.

9. Control means for a hydraulically actuable ram operating axially through a cylinder, comprising; a control valve including an axial bore formed in one end of said ram and having a communicating passage intermediate its length with the topmost portion of the interior of the cylinder and terminating in a counterbore having an outlet at its inner end formed through the side of the plunger exteriorly of the cylinder and a cap for said counterbore and having a button passage; a valve plug having a head slidably fitting in said bore and a collar slidably fitting in said counterbore and reduced in diameter therebetween to form a fluid passage between said communicating passage and said outlet and to provide differential pressure areas sufficient in degree only to move said collar to uncover said outlet as the ram moves or the button is released; said plug being axially movable for control of said outlet by said collar and having a control button projecting through said button passage for control of the valve for actuating the ram at will, and in degree proportionate to manual movement of the control button; said differential pressure areas constituting means for maintaining the adjusted position of the control button irrespective of movement of the ram and said button being responsive to slight manual pressures for overcoming said differential pressures, for maximum control sensitivity.

10. A structure as defined in claim 9; in which a second ram is in axial alignment with the first mentioned ram and having a cylinder and control valve combination of like structure associated therewith, and with the cylinders separated with a control housing formed therebetween; a valve in said control housing and having an inlet from said pump and a discharge to each cylinder, and including a movable member for closing the discharge to either cylinder at will for full delivery from said pump to the other cylinder; a shaft for adjusting said movable member and having a finger mounted thereon and cooperating between the control buttons of the respective rams for selective adjustment thereof simultaneously with control of said movable member; and manual control means for said shaft.

11. A hydraulic power unit comprising; a housing having a cylinder formed in each end in axial alignment and spaced apart to form a control compartment therebetween, and a removable cover for said control compartment, and a cylinder head for each end of each cylinder; a piston slidably operable in each cylinder and a plunger axially fixed in each piston and each slidably operable through both heads of its associated cylinder; a valve in said control chamber and having an inlet, and having an outlet to each of the cylinders, and a control member for selectively controlling said outlets, and a shaft for said control member; an axial bore formed in the inner end of each plunger and terminating in a counterbore of slightly larger diameter, and a cap for each counterbore and having an axial passage; a control valve having a plunger head slidable in said axial bore and axially adjustable and having each a button end projecting from the end of its plunger through the passage in its cap, and a collar slidable in said counterbore, and a discharge outlet in communication with the interior of the cylinder and including the space between said plunger head and said collar, and a passage formed through the wall of said counterbore with said collar controlling discharge of fluid from the cylinder; a finger mounted on said shaft and having its outer end interposed between the buttons on the respective valves for selective control thereof; a container included in said housing and a supply of fluid therein, and a pump mounted within said container and having its intake in communication with said supply and its discharge connected to the inlet of said valve, and driving means for said pump.

12. A control valve for a hydraulic power unit having a ram and a cylinder, comprising; an axial bore formed in one end of the ram and terminating at its outer end in a counterbore of slightly greater diameter having a diametric discharge outlet at one end; a plunger having a head slidable in said bore and a collar slidable in said counterbore for opening and closing said discharge outlet; said plunger being reduced in diameter between said head and said collar to form a passage for fluid; a passage formed radially through said ram within the cylinder and communicating between the cylinder and said discharge outlet; and means for maintaining the adjusted position of the plunger irrespective of relative movement of the ram and consisting of the differential areas of said head and said collar subjected to the pressure of the fluid and being of minimum necessary differential for maximum control sensitivity responsive to minimum manual urgence or restraining of the plunger.

DONALD E. HAWKINS.
RONALD S. HAWKINS.

REFERENCES CITED

The following references are of record in the file of this patent:

UNITED STATES PATENTS

| Number | Name | Date |
|---|---|---|
| 1,888,091 | Oberhoffken | Nov. 15, 1932 |
| 1,960,996 | Guernsey | May 29, 1934 |
| 1,994,806 | Barrett | Mar. 19, 1935 |
| 2,136,318 | Rossman | Nov. 8, 1938 |
| 2,210,916 | Kenyon et al. | Aug. 13, 1940 |
| 2,301,099 | Upp | Nov. 3, 1942 |
| 2,382,866 | Edge | Aug. 14, 1945 |

FOREIGN PATENTS

| Number | Country | Date |
|---|---|---|
| 41,148 | France | Aug. 9, 1932 |

(Addition to No. 631,619)